United States Patent
Brodkin

(10) Patent No.: US 10,048,927 B2
(45) Date of Patent: Aug. 14, 2018

(54) AUDIO DISPLAY PLAYBACK CONTROL

(75) Inventor: Panu Brodkin, Tampere (FI)

(73) Assignee: Nokia Technologies Oy, Espoo (FI)

( * ) Notice: Subject to any disclaimer, the term of this patent is extended or adjusted under 35 U.S.C. 154(b) by 79 days.

(21) Appl. No.: 14/406,528

(22) PCT Filed: Jun. 28, 2012

(86) PCT No.: PCT/FI2012/050674
§ 371 (c)(1),
(2), (4) Date: Dec. 8, 2014

(87) PCT Pub. No.: WO2014/001603
PCT Pub. Date: Jan. 3, 2014

(65) Prior Publication Data
US 2015/0153999 A1 Jun. 4, 2015

(51) Int. Cl.
*G06F 17/00* (2006.01)
*G06F 3/16* (2006.01)
*B06B 3/00* (2006.01)
*B06B 1/02* (2006.01)
*H04M 1/60* (2006.01)
(Continued)

(52) U.S. Cl.
CPC ............ *G06F 3/165* (2013.01); *B06B 1/0207* (2013.01); *B06B 3/00* (2013.01); *G05B 15/02* (2013.01); *G10K 9/122* (2013.01); *H04M 1/605* (2013.01); *H04R 7/045* (2013.01); *B06B 2201/55* (2013.01); *B06B 2201/70* (2013.01); *H04M 1/0266* (2013.01); *H04M 2250/12* (2013.01);
(Continued)

(58) Field of Classification Search
CPC ........ H04R 5/02; H04R 5/04; H04R 2499/11; H04R 2499/15; H04R 7/045; G06F 2200/1614; G06F 2200/1637; H04M 2250/12; G09G 2340/0492
See application file for complete search history.

(56) References Cited

U.S. PATENT DOCUMENTS

2001/0011993 A1 * 8/2001 Saarinen ............... G06F 1/1605
345/156
2002/0141607 A1 10/2002 Azima et al.
(Continued)

FOREIGN PATENT DOCUMENTS

EP 1271999 1/2003
EP 1748631 1/2007
(Continued)

OTHER PUBLICATIONS

International Search Report and Written Opinion received for corresponding Patent Cooperation Treaty Application No. PCT/FI2012/050674, dated Jun. 25, 2013, 13 pages.
(Continued)

*Primary Examiner* — Andrew C Flanders
(74) *Attorney, Agent, or Firm* — Harrington & Smith

(57) ABSTRACT

An apparatus comprising: at least one input configured to provide at least one input signal; a mode determiner configured to determine at least one mode of condition based on the at least one input signal; a controller configured to control the reproduction of at least one audio signal based on the at least one mode of condition; and at least one actuator configured to reproduce the at least one audio signal within the apparatus by vibration of a surface.

20 Claims, 10 Drawing Sheets

(51) Int. Cl.
  *G10K 9/122* (2006.01)
  *G05B 15/02* (2006.01)
  *H04R 7/04* (2006.01)
  *H04M 1/02* (2006.01)
  *H04R 3/12* (2006.01)

(52) U.S. Cl.
  CPC ............ *H04R 3/12* (2013.01); *H04R 2499/11* (2013.01); *H04R 2499/15* (2013.01)

(56) References Cited

U.S. PATENT DOCUMENTS

| | | | |
|---|---|---|---|
| 2006/0161278 A1* | 7/2006 | Maeda | H04M 1/0227 |
| | | | 700/94 |
| 2006/0239479 A1* | 10/2006 | Schobben | H04M 1/0266 |
| | | | 381/306 |
| 2007/0036348 A1* | 2/2007 | Orr | H04M 1/605 |
| | | | 379/424 |
| 2007/0057909 A1 | 3/2007 | Schobben et al. | |
| 2008/0130923 A1 | 6/2008 | Freeman | |
| 2009/0316943 A1* | 12/2009 | Frigola Munoz | H04R 7/045 |
| | | | 381/337 |
| 2010/0111351 A1* | 5/2010 | Berkhoff | H04R 7/045 |
| | | | 381/396 |
| 2011/0002487 A1* | 1/2011 | Panther | H04R 5/04 |
| | | | 381/300 |
| 2011/0012840 A1* | 1/2011 | Hotelling | G06F 3/0418 |
| | | | 345/173 |
| 2012/0051567 A1* | 3/2012 | Castor-Perry | H04R 29/002 |
| | | | 381/304 |
| 2015/0178038 A1* | 6/2015 | Yliaho | H04R 3/005 |
| | | | 455/566 |

FOREIGN PATENT DOCUMENTS

| | | |
|---|---|---|
| EP | 1988740 | 11/2008 |
| EP | 2275907 | 1/2011 |
| WO | 2011110901 A1 | 9/2011 |

OTHER PUBLICATIONS

Wikipedia. Distributed mode loudspeaker [online encyclopedia]. Jan. 26, 2012. Retrieved from the Internet:<URL:http:en-wikipedia.org/w/index/php?title=Distributed_mode_loudspeaker&oldid=473305338>.

\* cited by examiner

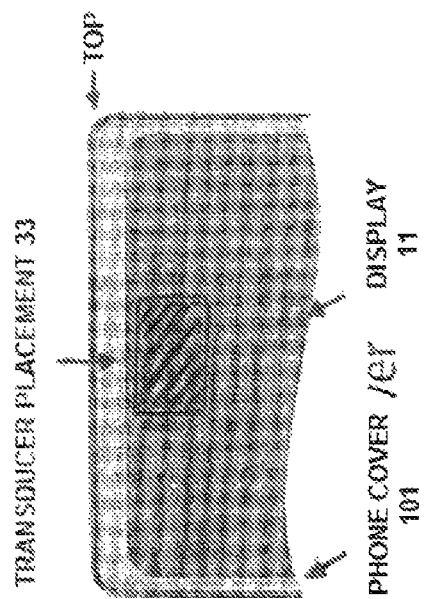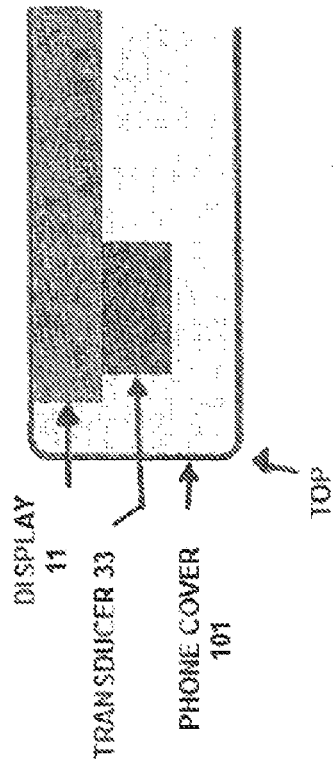
FIG 2

AUDIO DISPLAY PLAYBACK CONTROL

RELATED APPLICATION

This application was originally filed as PCT Application No. PCT/FI2012/050674 filed Jun. 28, 2012.

FIELD

The present application relates to audio display playback control, and in particular, but not exclusively to audio display playback control for use in portable apparatus.

BACKGROUND

The use of electro-dynamic loudspeakers or earpiece units in apparatus is common. Most electronic devices contain an electro dynamic loudspeaker or transducer configured to convert electrical signals into acoustic waves to be output and heard by the user of the apparatus. For example mobile or similar telephones can contain an integrated transducer sometimes called an integrated hands free (IHF) transducer configured to operate as an earpiece for speech and also as a loudspeaker for hands free and audio signal playback.

Furthermore it has been suggested that electro-dynamic loudspeakers or earpiece units in apparatus can be replaced by generating the acoustic waves using the display. In such suggestions the display is moved or vibrated by actuators or transducers coupled to the display.

SUMMARY

Embodiments attempt to address the above problem.

According to a first aspect there is provided a method comprising: providing at least one input signal; determining at least one mode of condition based on the at least one input signal; controlling the reproduction of at least one audio signal based on the at least one mode of condition; and reproducing the at least one audio signal using at least one actuator within an apparatus to vibrate a surface.

Reproducing the at least one audio signal may comprise: coupling the surface vibration to an object such that the object radiates the vibration to an object surface and reproduces the sound at the object surface as acoustic energy.

Determining the at least one mode of condition may comprise determining an 'on-radiating-object' mode where the apparatus is located on an object and controlling the reproduction of the at least one audio signal may comprise processing the at least one audio signal to allow for the coupling between the apparatus surface vibration and the object.

Determining the at least one mode of condition may comprise determining at least one of: a display facing upwards 'on-radiating-object' mode, wherein controlling the reproduction of the at least one audio signal comprises processing the at least one audio signal to allow for the coupling between the apparatus surface vibration and the object when the display is facing upwards; and a display facing downwards 'on-radiating-object' mode, wherein controlling the reproduction of the at least one audio signal comprises processing the at least one audio signal to allow for the coupling between the apparatus surface vibration and the object when the display is facing downwards.

Reproducing the at least one audio signal may comprise vibrating the apparatus surface to generate vibration which reproduces the at least one audio signal at the apparatus surface as acoustic energy.

Determining the at least one mode of condition may comprise determining an 'on-poorly-radiant-object' mode where the apparatus is located on an poorly radiant object and controlling the reproduction of the at least one audio signal may comprise processing the at least one audio signal to allow for the at least one audio signal reproduction at the apparatus surface as acoustic energy.

Determining the at least one mode of operation may comprise determining at least one of: a display facing upwards 'on-poorly-radiant-object' mode, wherein controlling the reproduction of the at least one audio signal may comprise processing the at least one audio signal to allow for the at least one audio signal reproduction at the apparatus surface as acoustic energy when the display is facing upwards; and a display facing downwards 'on-poorly-radiant-object' mode, wherein controlling the reproduction of the at least one audio signal may comprise processing the at least one audio signal to allow for the at least one audio signal reproduction at the apparatus surface as acoustic energy when the display is facing downwards; and a display vertical and proximate 'on-poorly-radiant-object' mode, wherein controlling the reproduction of the at least one audio signal may comprise processing the at least one audio signal to simulate earpiece audio signal reproduction at the apparatus surface.

Providing the at least one input signal may comprise at least one of: providing a sensor signal; providing an accelerometer signal; providing a proximity signal; providing a camera signal; providing a touch sensor signal; providing a compass signal; providing a user interface signal; providing a touch input signal and providing a microphone signal.

Controlling the at least one audio signal reproduction may comprise: determining at least one tuning parameter based on the at least one mode of condition; and tuning the at least one audio signal based on the at least one tuning parameter.

Tuning the at least one audio signal may comprise at least one of: filtering the at least one audio signal, wherein the at least one tuning parameter define a frequency response for the filtering; equalising the at least one audio signal, wherein the at least one tuning parameter define a frequency response for the equalising; and adjusting the level of the at least one audio signal wherein the at least one tuning parameter defines an adjustment factor for the adjusting the level of the at least one audio signal.

The mode of condition may comprise a set of mode variants, wherein determining at least one mode of condition may comprise determining a mode of condition and a mode variant associated with the mode of condition, and controlling the reproduction of the at least one audio signal may comprise controlling the reproduction of the at least one audio signal based on the mode of condition and the mode variant associated with the mode of condition.

The mode of condition may comprise at least one of: a mode of operation: a use-case; and a specific variant of a use-case.

Determining at least one mode of condition based on the at least one input signal may comprise determining an audio reproduction transfer function between the at least one audio signal and the reproduction of the at least one audio signal from at least one of a microphone and an accelerometer, and controlling the reproduction of the at least one audio signal may comprise determining at least one tuning parameter based on the transfer function for tuning the reproduction of the at least one audio signal.

According to a second aspect there is provided an apparatus comprising at least one processor and at least one memory including computer code for one or more programs, the at least one memory and the computer code configured to with the at least one processor cause the apparatus to at least perform: providing at least one input signal; determining at least one mode of condition based on the at least one input signal; controlling the reproduction of at least one audio signal based on the at least one mode of condition; and reproducing the at least one audio signal using at least one actuator within the apparatus to vibrate a surface.

Reproducing the at least one audio signal causes the apparatus to perform: coupling the surface vibration to an object such that the object radiates the vibration to an object surface and reproduces the at least one audio signal at the object surface as acoustic energy.

Determining the at least one mode of condition may cause the apparatus to perform determining an 'on-radiating-object' mode where the apparatus is located on an object and controlling the reproduction of the at least one audio signal may cause the apparatus to perform processing the at least one audio signal to allow for the coupling between the apparatus surface vibration and the object.

Determining the at least one mode of condition may cause the apparatus to perform determining at least one of: a display facing upwards 'on-radiating-object' mode, wherein controlling the reproduction of the at least one audio signal causes the apparatus to perform processing the at least one audio signal to allow for the coupling between the apparatus surface vibration and the object when the display is facing upwards; and a display facing downwards 'on-radiating-object' mode, wherein controlling the reproduction of the at least one audio signal causes the apparatus to perform processing the at least one audio signal to allow for the coupling between the apparatus surface vibration and the object when the display is facing downwards.

Reproducing the at least one audio signal may cause the apparatus to perform vibrating the apparatus surface to generate vibration which reproduces the at least one audio signal at the apparatus surface as acoustic energy.

Determining the at least one mode of condition may cause the apparatus to perform determining an 'on-poorly-radiant-object' mode where the apparatus is located on an poorly radiant object and controlling the reproduction of the at least one audio signal may cause the apparatus to perform processing the at least one audio signal to allow for the sound reproduction at the apparatus surface as acoustic energy.

Determining the at least one mode of operation may cause the apparatus to perform determining at least one of: a display facing upwards 'on-poorly-radiant-object' mode, wherein controlling the reproduction of the at least one audio signal causes the apparatus to perform processing the at least one audio signal to allow for the at least one audio signal reproduction at the apparatus surface as acoustic energy when the display is facing upwards; and a display facing downwards 'on-poorly-radiant-object' mode, wherein controlling the reproduction of the at least one audio signal causes the apparatus to perform processing the at least one audio signal to allow for the at least one audio signal reproduction at the apparatus surface as acoustic energy when the display is facing downwards; and a display vertical and proximate 'on-poorly-radiant-object' mode, wherein controlling the reproduction of the at least one audio signal causes the apparatus to perform processing the at least one audio signal to simulate earpiece audio signal reproduction at the apparatus surface.

Providing the at least one input signal may cause the apparatus to perform at least one of: providing an accelerometer signal; providing a sensor signal; providing a proximity signal; providing a camera signal; providing a touch sensor signal; providing a compass signal; providing a touch input signal; providing a user interface signal; and providing a microphone signal.

Controlling the reproduction may cause the apparatus to perform: determining at least one tuning parameter based on the at least one mode of condition; and tuning the at least one audio signal based on the at least one tuning parameter.

Tuning the at least one audio signal may cause the apparatus to perform at least one of: filtering the at least one audio signal, wherein the at least one tuning parameter define a frequency response for the filtering; equalising the at least one audio signal, wherein the at least one tuning parameter define a frequency response for the equalising; and adjusting the level of the at least one audio signal wherein the at least one tuning parameter defines an adjustment factor for the adjusting of the level of the at least one audio signal.

The mode of condition may comprise a set of mode variants, wherein determining at least one mode of condition may cause the apparatus to perform determining a mode of condition and a mode variant associated with the mode of condition, and controlling the reproduction of the at least one audio signal may cause the apparatus to perform controlling the reproduction of the at least one audio signal based on the mode of condition and the mode variant associated with the mode of condition.

The mode of condition may comprise at least one of: a mode of operation; a use-case; and a specific variant of a use-case.

Determining at least one mode of condition based on the at least one input signal may cause the apparatus to perform determining an audio reproduction transfer function between the at least one audio signal and the reproduction of the at least one audio signal from at least one of a microphone and an accelerometer input, and controlling the reproduction of the at least one audio signal causes the apparatus to perform determining at least one tuning parameter based on the transfer function for tuning the reproduction of the at least one audio signal.

According to a third aspect there is provided an apparatus comprising: means for providing at least one input signal; means for determining at least one mode of condition based on the at least one input signal; means for controlling the reproduction of at least one audio signal based on the at least one mode of condition; and means for reproducing the at least one audio signal using at least one actuator within the apparatus to vibrate a surface.

The means for reproducing the at least one audio signal may comprise: means for coupling the surface vibration to an object such that the object radiates the vibration to an object surface and reproduces the at least one audio signal at the object surface as acoustic energy.

The means for determining the at least one mode of condition may comprise means for determining an 'on-radiating-object' mode where the apparatus is located on an object and the means for controlling the reproduction of the at least one audio signal may comprise means for processing the at least one audio signal to allow for the coupling between the apparatus surface vibration and the object.

The means for determining the at least one mode of condition may comprise means for determining at least one of: a display facing upwards 'on-radiating-object' mode, wherein the means for controlling the reproduction of the at least one audio signal comprises processing the at least one audio signal to allow for the coupling between the apparatus surface vibration and the object when the display is facing upwards; and a display facing downwards 'on-radiatingobject' mode, wherein the means for controlling the reproduction of the at least one audio signal comprises processing the at least one audio signal to allow for the coupling between the apparatus surface vibration and the object when the display is facing downwards.

The means for reproducing the at least one audio signal may comprise means for vibrating the apparatus surface to generate vibration which reproduces the at least one audio signal at the apparatus surface as acoustic energy.

The means for determining the at least one mode of condition may comprise means for determining an 'on-poorly-radiant-object' mode where the apparatus is located on an poorly radiant object and controlling the reproduction of the at least one audio signal may comprise means for processing the at least one audio signal to allow for the at least one audio signal reproduction at the apparatus surface as acoustic energy.

The means for determining the at least one mode of operation may comprise means for determining at least one of: a display facing upwards 'on-poorly-radiant-object' mode, wherein the means for controlling the reproduction of the at least one audio signal comprises means for processing the at least one audio signal to allow for the at least one audio signal reproduction at the apparatus surface as acoustic energy when the display is facing upwards; and a display facing downwards 'on-poorly-radiant-object' mode, wherein the means for controlling the reproduction of the at least one audio signal comprises means for processing the at least one audio signal to allow for the at least one audio signal reproduction at the apparatus surface as acoustic energy when the display is facing downwards; and a display vertical and proximate 'on-poorly-radiant-object' mode, wherein the means for controlling the reproduction of the at least one audio signal comprises means for processing the at least one audio signal to simulate earpiece audio signal reproduction at the apparatus surface.

The means for providing the at least one input signal may comprise at least one of: means for providing a sensor signal; means for providing an accelerometer signal; means for providing a proximity signal; means for providing a camera signal; means for providing a touch sensor signal; means for providing a compass signal; means for providing a touch input signal means for providing a user interface signal; and means for providing a microphone signal.

The means for controlling the at least one audio signal reproduction may comprise: means for determining at least one tuning parameter based on the at least one mode of condition; and means for tuning the at least one audio signal based on the at least one tuning parameter.

The means for tuning the at least one audio signal may comprise at least one of: means for filtering the at least one audio signal, wherein the at least one tuning parameter define a frequency response for the filtering; means for equalising the at least one audio signal, wherein the at least one tuning parameter define a frequency response for the equalising; and means for adjusting the level of the at least one audio signal wherein the at least one tuning parameter defines an adjustment factor for the adjusting of the level of the at least one audio signal.

The mode of condition may comprise a set of mode variants, wherein the means for determining at least one mode of condition may comprise means for determining a mode of condition and a mode variant associated with the mode of condition, and the means of controlling the reproduction of the at least one audio signal may comprise means for controlling the reproduction of the at least one audio signal based on the mode of condition and the mode variant associated with the mode of condition.

The mode of condition may comprise at least one of: a mode of operation; a use-case; and a specific variant of a use-case.

The means for determining at least one mode of condition based on the at least one input signal may comprise means for determining an audio reproduction transfer function between the at least one audio signal and the reproduction of the at least one audio signal from at least one of a microphone and an accelerometer input, and the means for controlling the reproduction of the at least one audio signal may comprise means for determining at least one tuning parameter based on the transfer function for tuning the reproduction of the at least one audio signal.

According to a fourth aspect there is provided an apparatus comprising: at least one input configured to provide at least one input signal; a mode determiner configured to determine at least one mode of condition based on the at least one input signal; a controller configured to control the reproduction of at least one audio signal based on the at least one mode of condition; and at least one actuator configured to reproduce the at least one audio signal within the apparatus by vibration of a surface.

The apparatus may be further configured to couple the surface vibration to an object such that the object radiates the vibration to an object surface and reproduces the at least one audio signal at the object surface as acoustic energy.

The mode determiner may be configured to determine an 'on-radiating-object' mode where the apparatus is located on an object and the controller may be configured to control processing the at least one audio signal to allow for the coupling between the apparatus surface vibration and the object.

The mode determiner may be configured to determine at least one of: a display facing upwards 'on-radiating-object' mode, wherein the controller is configured to control processing the at least one audio signal to allow for the coupling between the apparatus surface vibration and the object when the display is facing upwards; and a display facing downwards 'on-radiating-object' mode, wherein the controller is configured to control processing the at least one audio signal to allow for the coupling between the apparatus surface vibration and the object when the display is facing downwards.

The at least one actuator may be configured to vibrate the apparatus surface to generate vibration which reproduces the at least one audio signal at the apparatus surface as acoustic energy.

The mode determiner may be configured to determine an 'on-poorly-radiant-object' mode where the apparatus is located on a poorly radiant object and the controller may be configured to the controller is configured to control processing the at least one audio signal to allow for the at least one audio signal reproduction at the apparatus surface as acoustic energy.

The mode determiner may be configured to determine at least one of: a display facing upwards 'on-poorly-radiant-object' mode, wherein the controller is configured to control processing the at least one audio signal to allow for the at least one audio signal reproduction at the apparatus surface as acoustic energy when the display is facing upwards; and a display facing downwards 'on-poorly-radiant-object' mode, wherein the controller is configured to control processing the at least one audio signal to allow for the at least one audio signal reproduction at the apparatus surface as acoustic energy when the display is facing downwards; and a display vertical and proximate 'on-poorly-radiant-object' mode, wherein the controller is configured to control processing the at least one audio signal to simulate earpiece audio signal reproduction at the apparatus surface.

The input may comprise at least one of: at least one sensor; an accelerometer; a proximity input; a camera; a touch sensor; a compass; a touch input a user interface; and a microphone.

The controller may comprise: a tuning parameter determiner configured to determine at least one tuning parameter based on the at least one mode of condition; and a tuner configured to tune the at least one audio signal based on the at least one tuning parameter.

The tuner may comprise at least one of: a filter configured to filter the at least one audio signal, wherein the at least one tuning parameter defines a frequency response for the filter; an equaliser configured to equalise the at least one audio signal, wherein the at least one tuning parameter defines a frequency response for the equaliser; and a level adjuster configured to adjust the level of the at least one audio signal wherein the at least one tuning parameter defines an adjustment factor for the level adjuster.

The mode of condition may comprise a set of mode variants, wherein the mode determiner may be configured to determine a mode of condition and a mode variant associated with the mode of condition, and the controller may be configured to control the reproduction of the at least one audio signal based on the mode of condition and the mode variant associated with the mode of condition.

The mode of condition may comprise at least one of: a mode of operation; a use-case; and a specific variant of a use-case.

The mode determiner may comprise a transfer function determiner configured to determine an audio reproduction transfer function between the at least one audio signal and the reproduction of the at least one audio signal from at least one of a microphone and an accelerometer input, and the controller may be configured to determine at least one tuning parameter based on the transfer function for tuning the reproduction of the at least one audio signal.

An electronic device may comprise apparatus as described above.

A chipset may comprise apparatus as described above.

BRIEF DESCRIPTION OF DRAWINGS

For better understanding of the present invention, reference will now be made by way of example to the accompanying drawings in which:

FIG. 2 shows schematically an example transducer configuration within an apparatus according to some embodiments;

DESCRIPTION OF SOME EMBODIMENTS

Figure 1:
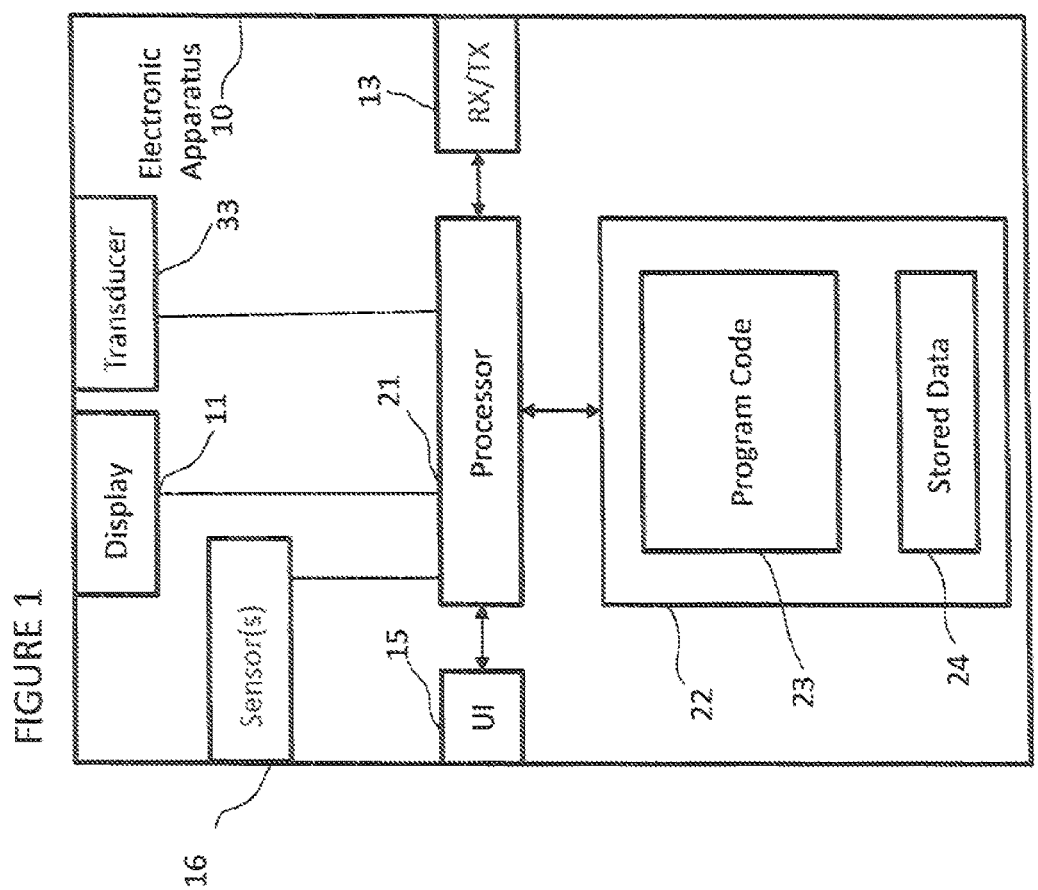
FIG. 1 shows schematically an electronic apparatus employing some embodiments.

The following describes in more detail possible audio transducer controllers for use in audio signal reproduction for the provision of higher quality audio signal reproduction communication. In this regard reference is first made to FIG. 1 which shows a schematic block diagram of an exemplary electronic device or apparatus 10, which may incorporate an enhanced audio transducer apparatus according to some embodiments.

The apparatus 10 may for example, as described herein be a mobile terminal or user equipment of a wireless communication system. In other embodiments the apparatus 10 may be an audio-video device such as video camera, a Television (TV) receiver, audio recorder or audio player such as a mp3 recorder/player, a media recorder (also known as a mp4 recorder/player), or any computer suitable for the generating audio signals in the way described herein.

The electronic device or apparatus 10 in some embodiments comprises a display 11, which is linked to a processor 21. The processor 21 is further linked to at least one transducer. The processor 21 in some embodiments can further be linked to a transceiver (RX/TX) 13, to a user interface (UI) 15 and to a memory 22.

In some embodiments the apparatus 10 comprises a processor 21. Furthermore in some embodiments the apparatus 10 comprises a memory 22, and further a data storage section 24 and program code section 23. The processor 21 can in some embodiments be configured to execute various program codes. The implemented program codes in some embodiments comprise audio signal reproduction control code as described herein. The implemented program codes 23 can in some embodiments be stored for example in the memory 22 for retrieval by the processor 21 whenever needed. The memory 22 could further provide a section 24 for storing data.

The audio signal reproduction control code in some embodiments can be implemented in hardware or firmware.

In some embodiments the apparatus 10 comprises a user interface 15. The user interface 15 enables a user to input commands to the electronic device 10, for example via a touch screen configured to provide both input and output functions for the user interface.

The apparatus 10 in some embodiments comprises a transceiver 13 suitable for enabling communication with other apparatus, for example via a wireless communication network.

The apparatus 10 in some embodiments can receive a bit stream with suitably encoded audio data from another apparatus via the transceiver 13. In this example, the processor 21 may execute decoding program code stored in the memory 22. The processor 21 in such embodiments decodes the received data. Furthermore the processor 21 in some embodiments can be configured to control the output of received data to actuate the transducer such that the audio signal is output to the user by the motion of the display.

Execution of the transducer activation in some embodiments can be triggered by an application called by the user via the user interface 15.

The received encoded data in some embodiments can also be stored instead of an immediate presentation via the transducer 33 in the data section 24 of the memory 22, for instance for later decoding and presentation.

The apparatus in some embodiments comprises at least one sensor 16. The sensor can be any suitable sensor configured to provide an input to the processor 21 to assist in the controlling of the reproduction of the audio signal using the transducer 33.

It is to be understood again that the structure of the apparatus 10 could be supplemented and varied in many ways.

Figure 3:
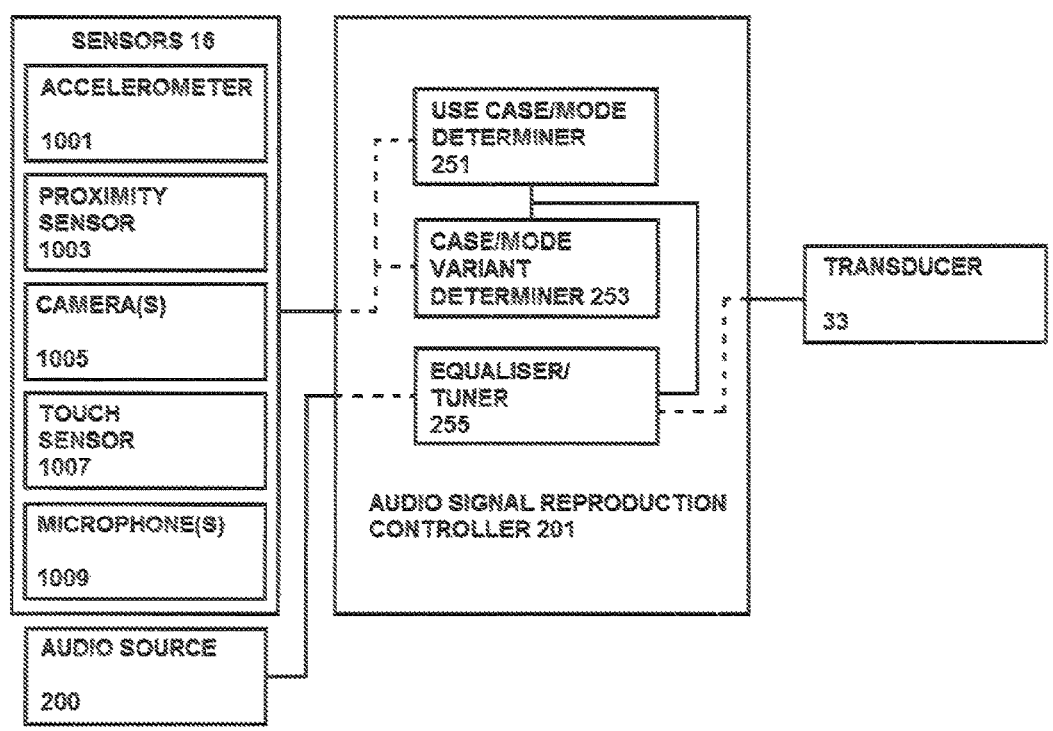
FIG. 3 shows schematically an audio signal reproduction controller according to some embodiments.
Figure 9:
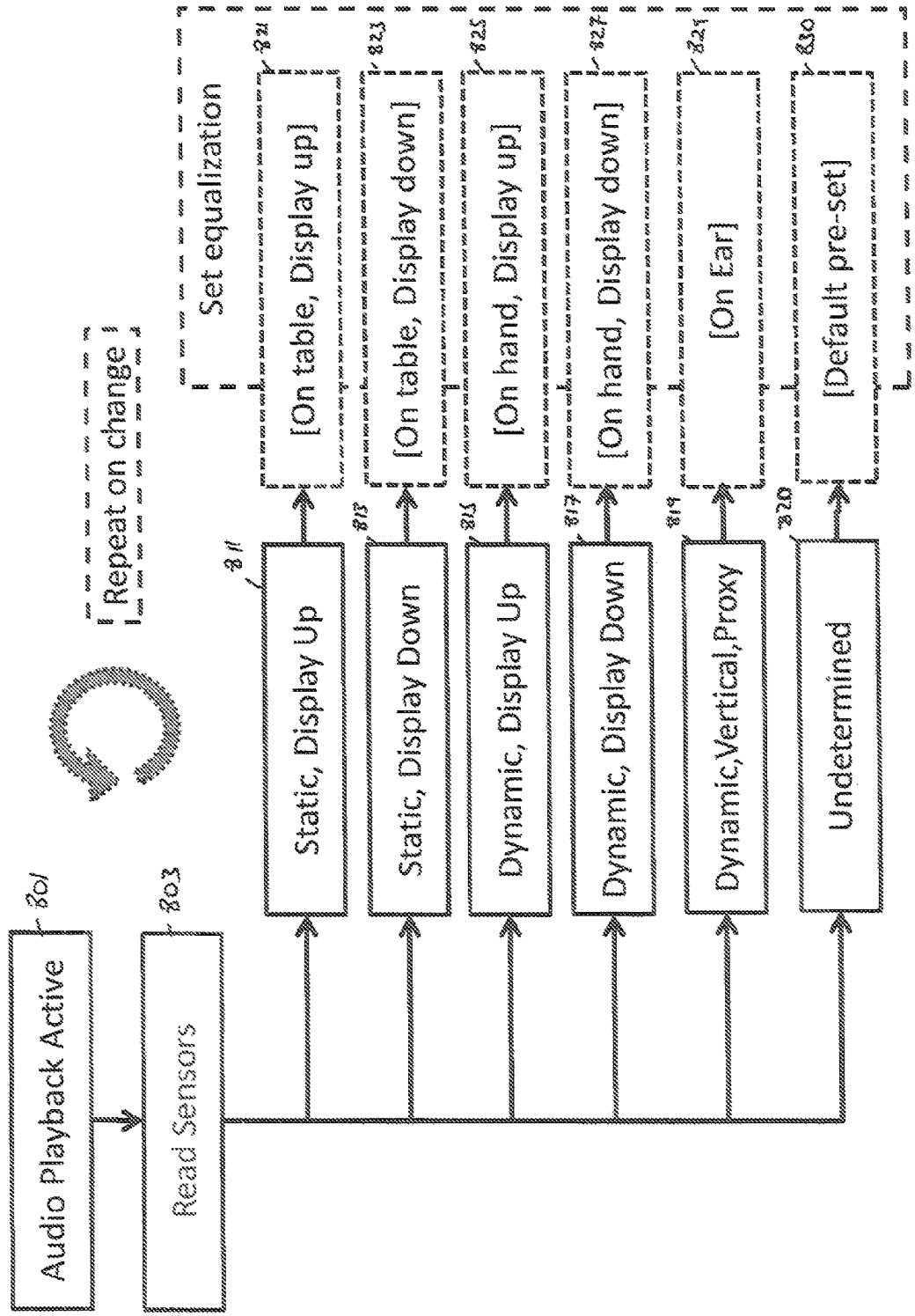
FIG. 9 shows a state-space example diagram of the operation of some embodiments.
Figure 10:
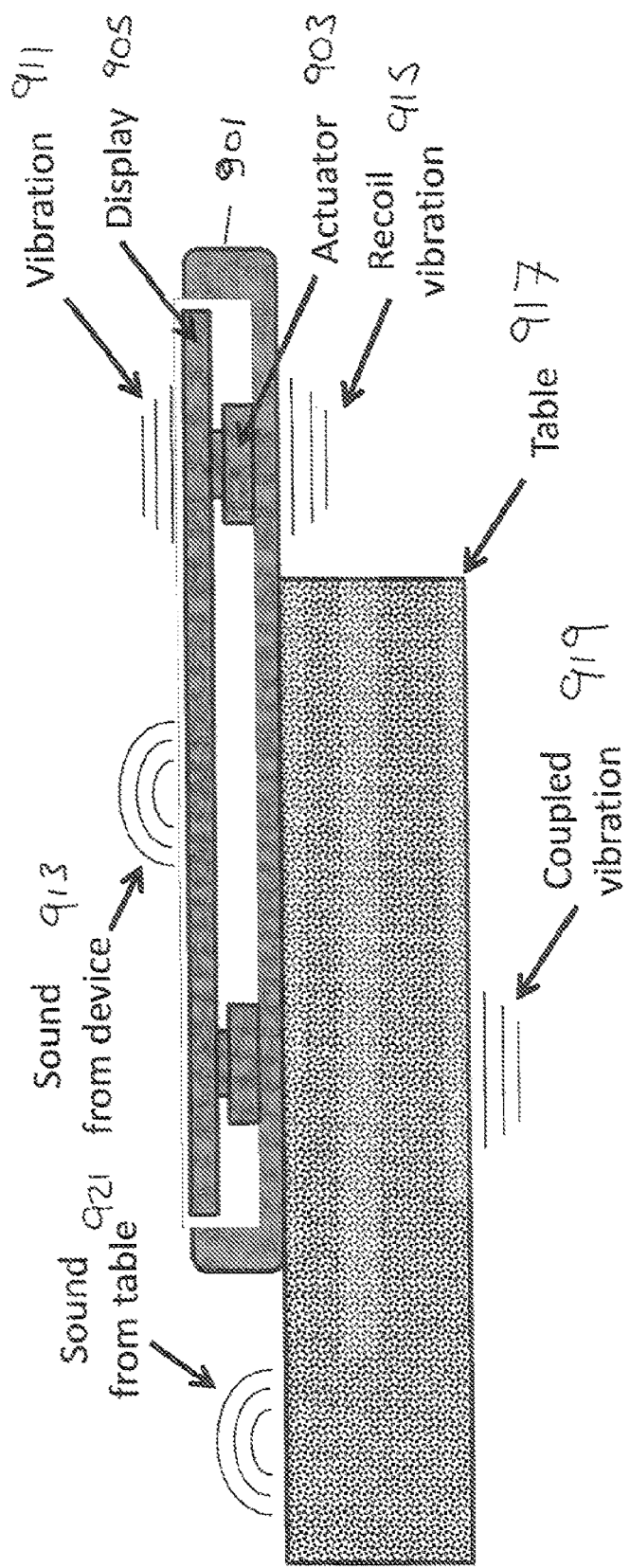
FIG. 10 shows schematically an apparatus configured to generate coupled and non-coupled acoustic signals according to some embodiments.

It would be appreciated that the schematic structures described in FIGS. 2, 3 and 10 and the method steps shown in FIGS. 4 to 7 and 9 represent only a part of the operation of audio signal reproduction generated by apparatus as exemplarily shown in FIG. 1.

The concept of the application is to improve upon the audio signal reproduction implementations currently being designed. As discussed herein current mobile apparatus and mobile phone designs are such that the display 101 or 'singing display', are attached with suspension to the outer cover and are driven by transducers by an audio signal causing the display surface to produce sound or acoustic waves to produce acceptable integrated hands free operation. It would be understood that in some embodiments the display can be rigidly mounted at the edges but be configured to flex sufficiently to generate vibrations capable of generating audio signal reproduction. Furthermore it would be understood that in some embodiments an apparatus surface other than the display can be vibrated to generate the audio signal reproduction as the vibration of the surface generate acoustic wave energy.

However there can be issues when the user places the apparatus on a surface or locates their ear against the display as the dampening effect against the display can cause the audio signal reproduction quality to deteriorate.

The concept as implemented in embodiments as described herein is to control the operation of at least one transducer coupled to the display (or other surface of the apparatus). The control of the at least one transducer can be based on or dependent on inputs such as sensor and/or user interface inputs (which can determine the environmental conditions, the use case or mode of condition of the apparatus) and therefore control audio signal processing prior to outputting the audio signal to the transducer to improve the quality of the audio signal reproduction.

For example placing the apparatus on a suitable surface can be detected and when a hands free mode required the controller can control the output of the transducer such that the external surface acts as a radiator for the sound as the vibrations from the transducers are mechanically coupled and spread to a larger surface which radiates the sound. Furthermore the concept as implemented and described herein can be extended to equalising or tuning the audio signal such that parameters controlling the equalising, tuning or otherwise processing the audio signal are determined by analysing the environmental conditions within which the apparatus is operating. Furthermore the by analysing the environmental conditions can include monitoring the vibrations to control the equalising, tuning or processing of the audio signal output to the transducer.

With respect to FIG. 2 an example implementation of the transducer placement location according to some embodiments is shown. The left hand side of FIG. 2 shows a sectioned view from the top example of the apparatus down through the apparatus, and the right hand side of FIG. 2 shows a "front" view of the "top" of the apparatus is shown.

The sectioned view of FIG. 2 shows the apparatus or phone cover 101, to the "front" of the apparatus is shown the display 11. The display in some embodiments is flexibly mounted on the casing.

The display 11 can comprise any suitable display technology. For example the display can be located below a user interface touch input module and project an image through the touch input module to be viewed by the user. The display 11 can employ any suitable display technology such as liquid crystal display (LCD), light emitting diodes (LED), organic light emitting diodes (OLED), plasma display cells, Field emission display (FED), surface-conduction electron-emitter displays (SED), and Electrophoretic displays (also known as electronic paper, e-paper or electronic ink displays). In some embodiments the display 11 employs one of the display technologies projected using a light guide to the display window. The display 11 in some embodiments can be implemented as a physical fixed display. For example the display can be a physical decal or transfer on the front window. In some other embodiments the display can be located on a physically different level from the rest of the surface, such a raised or recessed marking on a front window. In some other embodiments the display can be a printed layer illuminated by a light guide under the front window.

Within the apparatus and attached or coupled to the display 11 is the transducer 33. The transducer 33 can in some embodiments be located approximately at the position where the ear of the user would be located when holding the apparatus normally.

The transducer (or actuator) 33 can in some embodiments be a piezo (or piezo-electric) transducer configured to generate a force, such as a bending force when a current is passed through the transducer. This bending force can in some embodiments transferred via a pad to the display 11. It would be understood that in other embodiments the arrangement, structure or configuration of the singing or tactile audio display component can be any suitable coupling between the transducer (such as a piezo-electric transducer) and the display. In some embodiments the transducer 33 further comprises a transducer amplifier configured to receive an audio signal and generate a suitable driving signal to power the transducer.

Thus as shown on the right hand side of FIG. 2 the transducer 33 is approximately (or substantially) along the middle line of the front of the mobile phone or apparatus and substantially to one side or edge of the longest side of the display 11. It would be understood that in some embodiments the transducer 33 can be located at any suitable position providing the transducer 33 output is able to generate an acoustic wave listenable by the user. Furthermore it would be understood that in some embodiments there can be more than one transducer 33 which can be individually or co-operatively controlled.

With respect to FIG. 3 the audio signal reproduction control apparatus (display controller) is shown in further detail. Furthermore with respect to FIGS. 4 to 7 the operation of the display controller is shown in further detail.

The audio signal reproduction controller or display controller 201 is configured to receive at least one input from the sensor or sensors 16 and furthermore an audio signal from an audio source 200, process the audio signal dependent on the sensors 16 and output the processed audio signal to the transducer 33 for audio signal reproduction. Furthermore in some embodiments the audio signal reproduction controller 201 can be configured to receive a user input from the user interface.

The sensor or sensors 16 can be at least one of the following sensors described.

In some embodiments the sensor or sensors comprise accelerometers 1001. The accelerometers 1001 is configured to a micro-electro-mechanical system (MEMS) accelerometer configured to output a value dependent on the acceleration of the apparatus. However it would be understood that in some embodiments any suitable accelerometer implementation can be used.

In some embodiments the sensor 16 comprises a proximity sensor 1003. The proximity sensor 1003 can be any suitable proximity sensor implementation, such as a light level detector configured to output a value dependent on the light striking the apparatus. In such embodiments an object in proximity to the apparatus would cast a shadow over the sensor and therefore lower the light level detected at the proximity sensor.

In some embodiments the sensor comprises a camera or cameras 1005. The camera or cameras can be configured to determine using machine vision determination any objects in proximity or contact with the apparatus.

In some embodiments the sensor comprises a touch sensor 1007. In some embodiments the touch sensor 1007 is implemented as part of the user interface display touch screen display and/or a touch sensor 1007 separate from the display. The touch sensor 1007 can in such embodiments be configured to determine any and the location of contact on the surface or proximate to the surface of the apparatus. It would be understood that the touch sensor 1007 can be implemented as any suitable touch detection technology, for example by capacitance or resistance sensors.

In some embodiments the sensor comprises a microphone or microphones 1009. The microphone or microphones 1009 can be configured to receive acoustic inputs and generate an audio signal which can be passed to the audio signal reproduction controller 201. The microphone or microphones 1009 can be any suitable microphone implementation and can in some embodiments be digital microphones configured to output digital signals without the need of a separate analogue to digital converter.

In some embodiments the sensor comprises a compass, gyroscope or other similar sensor configured to determine the orientation or change of orientation of the apparatus.

The sensor can in some embodiments comprises a user interface input. In other words the user operates as a sensor indicating the environmental conditions for example by selecting a mode of condition from a list of conditions— apparatus on radiating surface, apparatus being held etc.

In some embodiments the apparatus comprises an audio source 200. The audio source 200 can be any suitable audio source, such as a received audio signal, a stored and retrieved audio signal, and any type of audio signal such as for example a music audio signal or voice audio signal. The audio source 200 is shown as an example audio signal input to the apparatus and in particular the audio signal reproduction controller 201.

The audio signal reproduction controller 201 in some embodiments comprises a use case/mode determiner 251. The use case/mode determiner 251 is configured to receive sensor information describing the environmental conditions the apparatus is operating in—the mode of condition (and further in some embodiments user input values) and from this information determine the current use case or mode of condition for the apparatus with respect to audio signal reproduction. The mode of condition can in some embodiments further comprise the mode of operation of the apparatus. For example the mode of condition can incorporate the mode of operation such as hands free or earpiece simulation modes.

For example the use case or mode of audio signal reproduction of the apparatus can be a hands free use or earpiece use and more specifically with respect to hands free use or modes whether the hands free use is a surface vibration coupling use or display vibration use mode.

Figure 4:
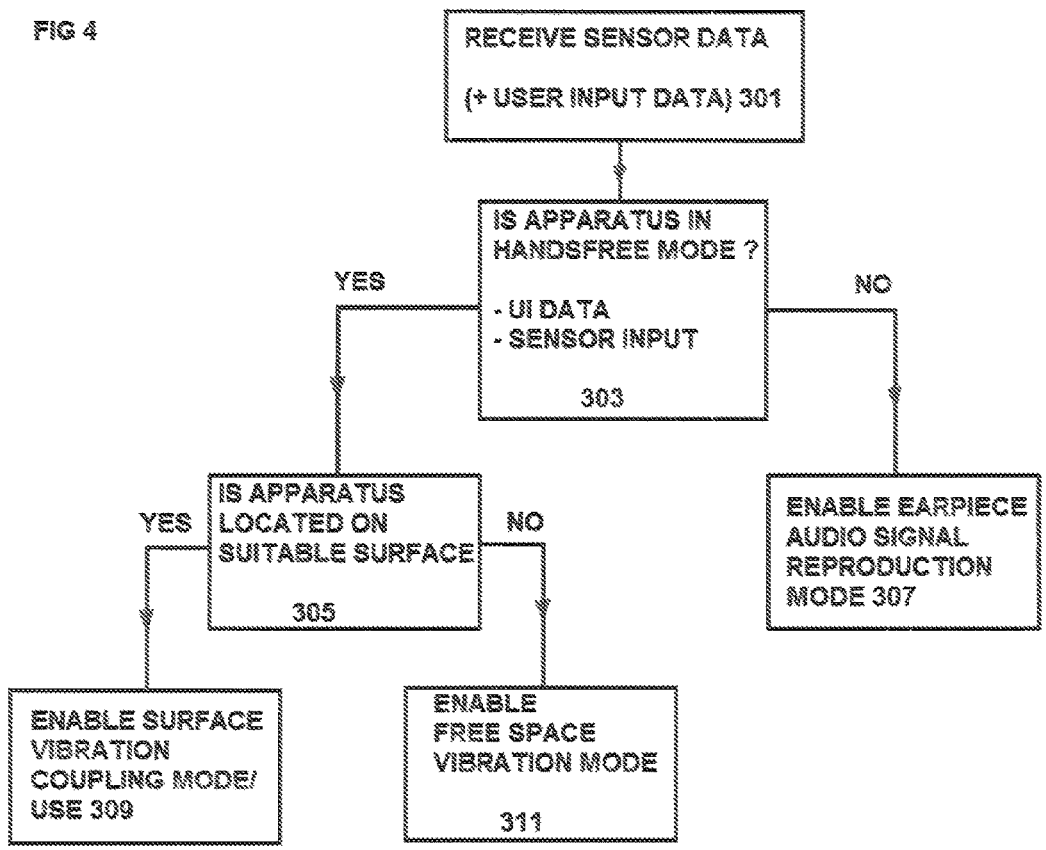
FIG. 4 shows a flow diagram showing the operation of the use case/mode determiner according to some embodiments.

With respect to FIG. 4 the operation of the use case/mode determiner 251 is shown in further detail.

The use case/mode determiner 251 can in some embodiments be configured to receive the sensor data from the sensor or sensors 16. Furthermore in some embodiments the use case/mode determiner 251 can be configured to receive user input data.

The operation of receiving the sensor data and optionally the user input data is shown in FIG. 4 by step 301.

In some embodiments the use case/mode determiner 251 is configured to then determine whether the apparatus is to operate in a hands free mode. In some embodiments the hands free mode determination can be performed dependent on the sensor information. For example whether or not there is a 'touch' on the top or 'front' of the display indicating that the user holding the apparatus against their head and therefore not using the apparatus in hands free mode but expecting an earpiece mode. The 'touch' can be determined based on a capacitive type sensor sensitive to human type conductivity. Furthermore in some embodiments the sensor information provided by the sensors can be that the apparatus is being held in a 'vertical' orientation, which would be the typical orientation used when held against the ear.

In some embodiments the sensor in the form of a camera can be used to determine whether or not there is an unobstructed top side. In such embodiments the camera information can be configured to determine that the apparatus is not covered or in a bag or held against the head.

The operation of determining whether the apparatus is in a hands free mode is shown in FIG. 4 by step 303.

Where the use case/mode determiner 251 determines that the apparatus is not operating in a hands free mode then the use case/mode determiner 251 can be configured to enable an earpiece audio signal reproduction mode to the used.

In some embodiments the use case/mode determiner 251 can then generate or retrieve suitable equaliser/tuner parameters 255 to be used by the equaliser/tuner 255 such that an audio signal from the audio source is processed in a suitable manner such that when output to the transducer 33 the audio signals produce an acoustic signal simulating the effect of an earpiece transducer.

The operation of enabling the earpiece audio signal reproduction mode is shown in FIG. 4 by step 307.

Where the apparatus is determined to be operable in a hands free mode then the use case/mode determiner 251 can further perform a determination of whether the apparatus is located on a suitable surface.

For example in some embodiments the sensors 16 can provide suitable information (such as for example a near zero motion determination by the accelerometer), or that there is no touch on the 'front' or further that the 'front' or top side of the apparatus is covered.

The operation of determining whether the apparatus is located on a suitable surface is shown in FIG. 4 by step 305.

The use case/mode determiner 251 can in some embodiments when determining that the apparatus is located on a suitable service enable a surface vibration coupling mode/use case.

The operation of enabling the surface vibration coupling mode/use case is shown in FIG. 4 by step 309.

The use case/mode determiner 251 in some embodiments can by enabling the surface vibration coupling mode/use case retrieve or generate equalisation or tuning parameters to enable the transducer vibration to be coupled to the surface upon which the apparatus is resting such that the vibrations from the actuators or transducers are mechanically coupled and spread to the surface which radiates the sound. Thus in such a mode/use case the audio signal from the audio source 200 is processed by the equaliser/tuner 255 such that the transducer vibration which is mechanically coupled produces within the surface a radiated sound which accurately reproduces the audio signal.

When the apparatus determines that it is not located on a suitable surface but operating in hands free mode then the use case/mode determiner 251 can be configured to enable a free space vibration mode. a suitable object surface is one which radiates the coupled vibration at a surface generating acoustic waves. Non suitable surfaces are poorly radiating object surfaces. Poorly radiating objects can be for example a 'hand' or a rubber surface. The poorly radiating object may or may not be absorbent or lossy as the acoustic output could differ whether the object is poorly radiating due to stiffness or mass (like stone block) or due to high losses (absorbent/lossy like soft rubber or viscous gel).

The enablement of a free space vibration mode is shown in FIG. 4 by step 311.

The enablement of the free space vibration mode can cause the use case/mode determiner 251 to retrieve or generate a third set of equalisation or tuner parameters to be passed to the equaliser/tuner 255. These parameters are configured to set-up the equaliser/tuner 255 such that the processed audio signal from the audio source 200 when passed to the transducer 33 which is coupled to the display causes the display to generate an acoustic signal which simulates a hands free transducer output in terms of audio signal reproduction via the display.

It would be understood that in some embodiments further decisions and further modes or use cases can be determined other than the three uses described herein.

Figure 5:
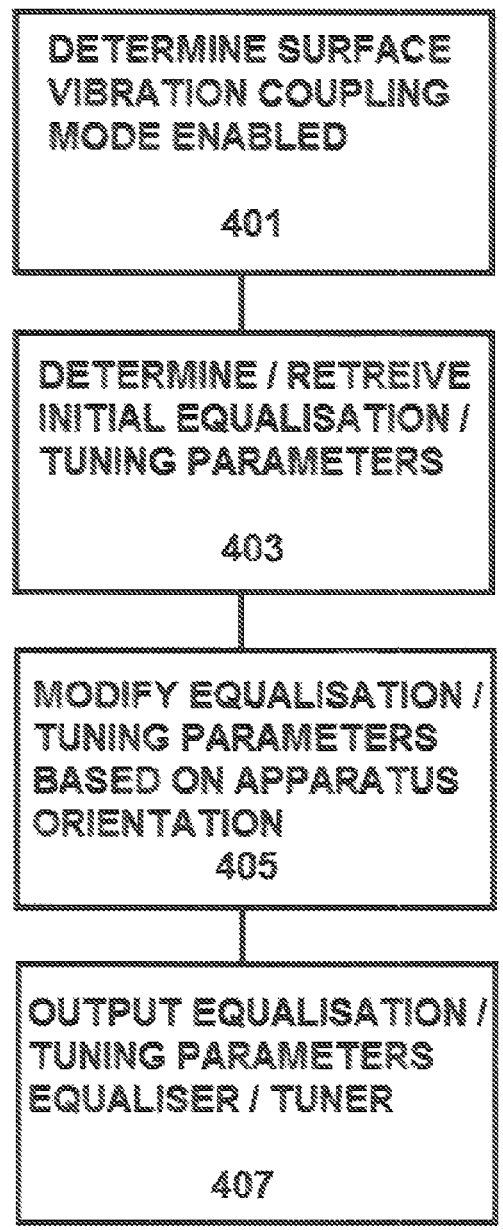
FIG. 5 shows a flow diagram showing the operation of the use case/mode variant determiner according to some embodiments.
Figure 6:
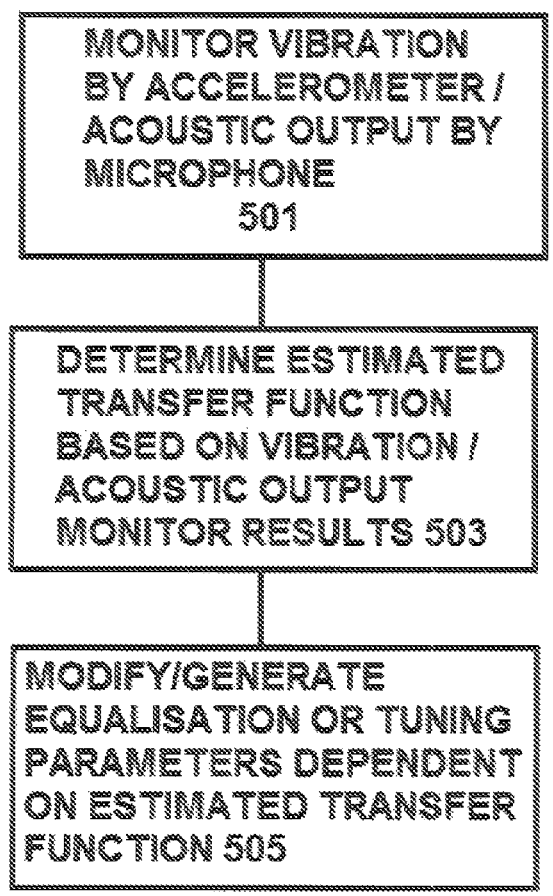
FIG. 6 shows a flow diagram showing a further example of the operation of the use case/mode variant determiner according to some embodiments.

With respect to FIGS. 5 and 6 example operations of the case/mode variant determiner 253 are described in further detail. The case/mode variant determiner 253 is configured to determine or modify the equalisation/tuning parameters to be passed to the equaliser/tuner dependent on the variant or variance allowed within the use case or mode.

For example as shown in FIG. 5 the enablement of the surface vibration coupling mode can produce significant variance dependent on the orientation of the apparatus. In other words the apparatus when resting on its rear or back surface is mechanically coupled with a different transfer function to when the apparatus is resting on and end or edge.

The use case/mode determiner 253 can therefore determine the use case/mode the controller is currently operating in. For this example the use case/mode variant determiner can be configured to determine whether the surface vibration coupling mode has been enabled.

The determination of whether the surface vibration coupling mode has been enabled is shown in FIG. 5 by step 401.

Furthermore in some embodiments the case/mode variant determiner can determine or retrieve an initial equalisation/tuning parameter or parameters dependent on the current use case/mode. For example in some embodiments the case/mode variant determiner 253 can retrieve the equalisation/tuning parameters from the use case/mode determiner 251.

The operation of determining or retrieving an initial equalisation/tuning parameter or parameters dependent on the current use case/mode is shown in FIG. 5 by step 403.

The use case/mode variant determiner 253 can in some embodiments determine a variance or sub-use case or mode of condition of the current use case or mode. For example with respect to the orientation variant of the surface vibration coupling mode the accelerometer can be configured to supply information concerning the orientation of the apparatus (and thus the contact surface). In other words the use case/mode variant determiner in this example determines which direction is up and which direction is down and therefore in contact with the surface.

The use case/mode variant determiner 253 can then modify the equalisation/tuning parameters based on determined variant. For example the parameters are modified dependent on the apparatus orientation.

The operation of modifying the equalisation/tuning parameters based on the determined variant (the apparatus orientation) is shown in FIG. 5 by step 405.

The use case/mode variant determiner 253 can then be configured to output the equalisation/tuning parameters to the equaliser/tuner 255.

The operation of outputting the modified parameters is shown in FIG. 5 by step 407.

Thus the equaliser/tuner 255 can be configured to receive suitable parameters to setup the equalisation or tuning or other processing of the audio signal from the audio source 200 such that when output to the transducer 33 the variant or sub-mode is allowed for. For example the contact surface affecting the transfer function coupling the vibration to the suitable surface is allowed for.

Although the example shown is with regards to orientation it would be understood that other variants to the processing parameters could be implemented in some embodiments. For example the degree of surface coupling could be determined based on the light level detected by an optical sensor on the surface. In other words the greater degree of shadow the greater the area of contact between the surface and the apparatus blocking light from reaching the sensor.

With respect to FIG. 6 a further example of the operation of the use case/mode variant determiner 253 is shown. In the example shown in FIG. 6 the transfer function between the vibration generated by the transducer and the surface is monitored by at least one of the sensors 16. For example in some embodiments the sensor is a microphone configured to generate an audio signal proportional to the acoustic output of the surface. However in some embodiments the sensor can be an accelerometer 1001 which determines the vibration generated by the surface as experienced within the apparatus.

The operation of monitoring the vibration or acoustic output is shown in FIG. 6 by step 501.

The use case/mode variant determiner 253 can then use the vibration or acoustic output monitoring to determine an estimated transfer function based on the vibration/acoustic output monitor results.

The determination of the estimated transfer function is shown in FIG. 6 by step 503.

Furthermore the use case/mode variant determiner 253 can then use the estimated transfer function to modify current or generate new equalisation, tuning or other processing parameters to be passed to the equaliser/tuner 255.

In some embodiments the use case/mode determiner and use case variant determiner are the same function or apparatus and the steps described herein are performed concurrently.

In some embodiments the use case/mode variant determiner 253 can use the transfer function to determine a change in the environment in other words a change in variant. For example the transfer function can be used to determine whether the apparatus has been moved to or replaced on a radiating surface or non-radiating surface (such as a soft surface, a hard surface, a too small surface, a lossy surface or absorbent surface).

Furthermore the case/mode variant determiner 253 in monitoring the current case or mode can determine whether or when the apparatus is changed to a different mode such as when the sensor state changes, the audio source audio signal stops or a user interface input causes a change.

Figure 7:
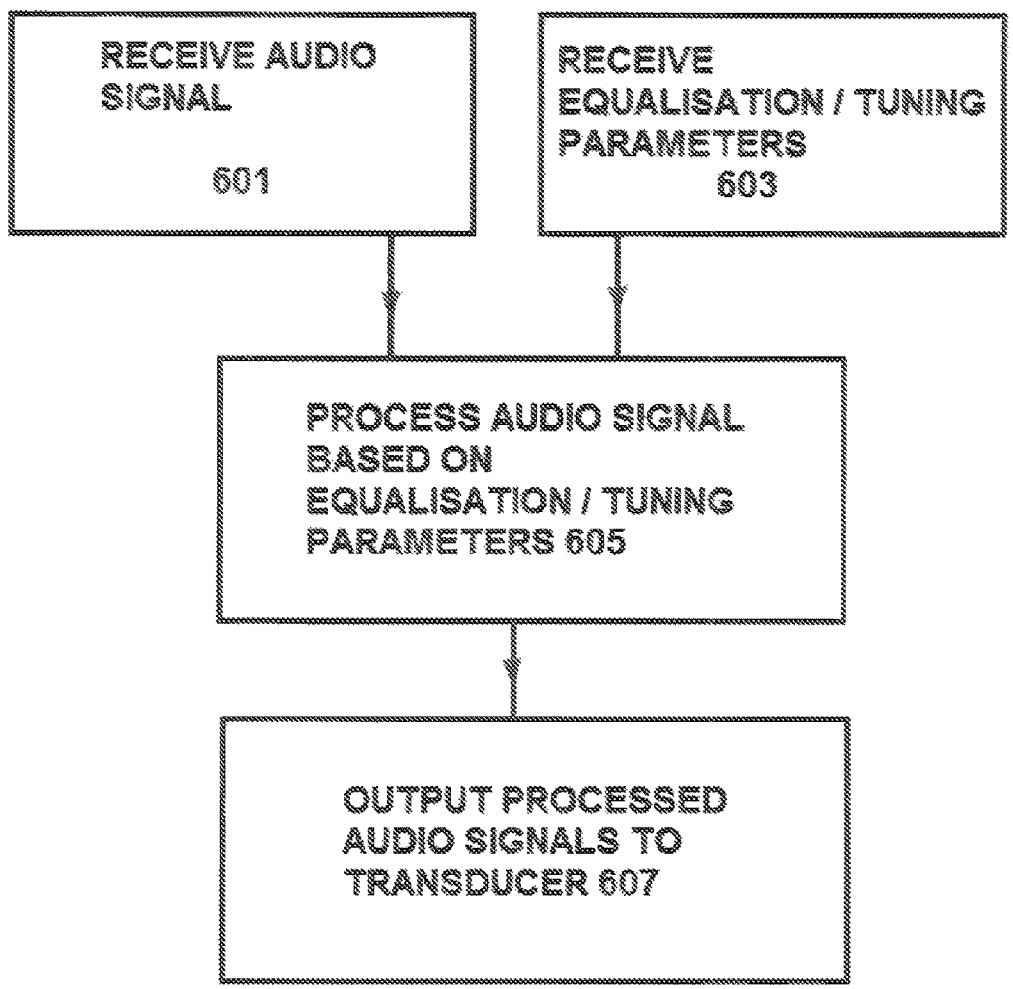
FIG. 7 shows a flow diagram showing the operation of the equaliser/tuner with respect to controlling an audio output sent to the transducer according to some embodiments.

With respect to FIG. 7 the operation of the equaliser/tuner 255 is described in further detail. The equaliser/tuner 255 is configured to receive from the audio source 200 a suitable audio signal.

The operation of receiving an audio signal is shown in FIG. 7 by step 601.

Furthermore the equaliser/tuner 255 is configured to receive from the use case/mode determiner 251 and/or the use case/mode variant determiner 253 equalisation/tuning parameters.

The operation of receiving equalisation/tuning parameters is shown in FIG. 7 by step 603.

The equaliser/tuner 255 is configured to process the audio signal based on the equalisation/tuning parameters. Thus in some embodiments the equaliser/tuner 255 processes the audio signal according to any suitable filtering, equalisation, or other suitable processing implementation.

The operation of processing the audio signal based on the equalisation/tuning parameters is shown in FIG. 7 by step 605.

The equaliser/tuner 255 can then be configured to output the processed audio signals to the transducer. The output audio signals can then be converted via the transducer to suitable acoustic signals.

The operation of outputting processed audio signals to the transducer is shown in FIG. 7 by step 607.

Figure 8:
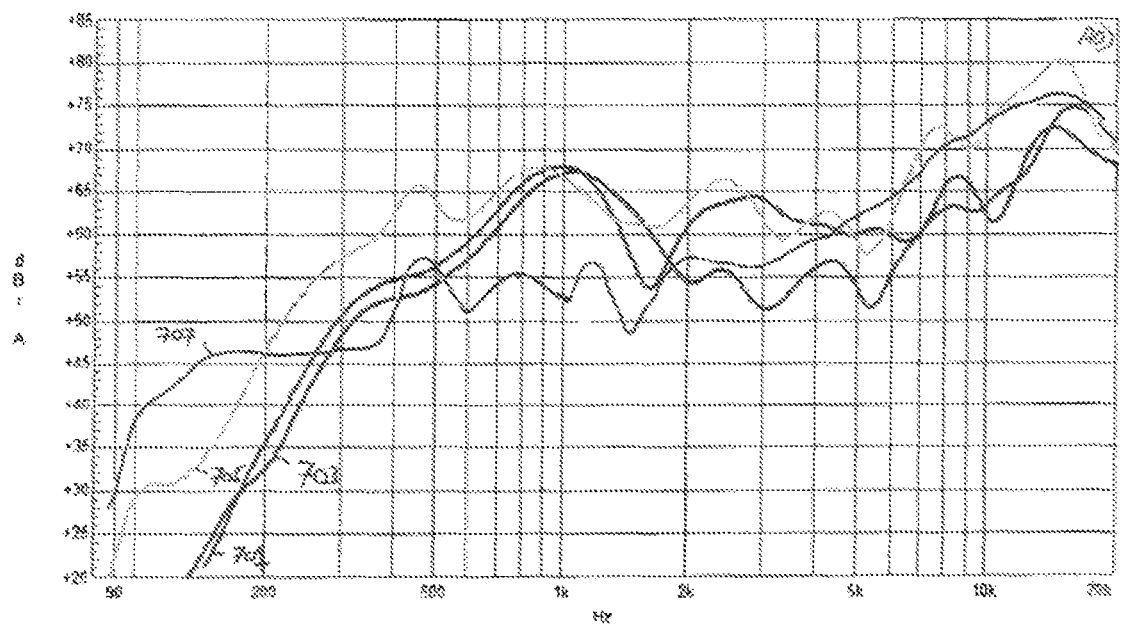
FIG. 8 shows a series of example frequency responses for apparatus with example orientation and operating on example surfaces.

With respect to FIG. 8 the conceptual reason for the application is shown. The frequency response plots shown in FIG. 8 are for an apparatus which can be operated in various modes, each mode attempting to target a frequency response (for example a 'flat and wide' response). The concept described herein is to attempt to improve the frequency response of the apparatus for each mode by tuning each mode's frequency response to yield a response closer to the target.

FIG. 8 specifically shows frequency response plots for acoustic signal generation where an apparatus is located on two types of surface with two different orientations are shown. For example FIG. 8 shows a first plot where the apparatus is located on a simulated hand with the display surface orientated upwards as shown by plot 701, and a second plot where the apparatus is located on a simulated hand with the display orientated downwards (i.e. towards the surface) as shown in plot 703. From these two frequency responses it can be seen that dependent on the orientation of the apparatus the audio output spectrum is changed. This change of audio output spectrum can be allowed for by the processing of the audio signal as described herein in the embodiments above. This is achieved in these embodiments by receiving an input such as for example from a sensor or user interface, determining a mode or use case (for example the orientation of the apparatus when being held), determining audio signal processing parameters such as equalisation parameters based on the determined mode or use case (or a variant of the mode or use case), and processing the audio signal prior to it being reproduced using these parameters. Thus for example the frequency response of the upwards orientated apparatus can be equalised to be more like the frequency response of the downwards orientated apparatus.

Similarly FIG. 8 shows a third frequency response plot where the apparatus is located on a simulated table surface with the display orientated upwards (as shown by plot 705). As can be seen the placement of the apparatus on the simulated surface boosts the output levels across the spectrum of the frequency response when compared to the simulated hand. Furthermore FIG. 8 shows a fourth plot where the apparatus is located on a simulated table surface with the display orientated downwards (as shown by plot 707). Comparing the orientation downwards when placed on the simulated surface to the orientation upwards when placed on the simulated surface the frequency response from the orientation downwards has a much greater low frequency component (in other words the lower frequency components are boosted whilst the mid and higher frequency components are relatively attenuated). Once again this shows the concept behind the application as the change of audio output spectrum (between the orientations, and also between the surface location modes) can be allowed for by processing the audio signal.

In other words the concept behind embodiments or implementations as described above is one of receiving an input (such as from a sensor or user interface), determining a mode or use case from this input (for example the orientation of the apparatus and/or where the apparatus is situated), determining audio signal processing parameters such as equalisation parameters based on the determined mode or use case (or a variant of the mode or use case), and processing the audio signal prior to it being reproduced using these parameters, enables the frequency response of the apparatus to be more like a required frequency response and thus attempt to reduce the effect of the location, use-case or mode of the apparatus.

With respect to FIG. 9 an example parameter output tree dependent on the sensor information is shown with respect to some embodiments. The figure shows the apparatus as described herein configured to determine that there is active audio playback required.

The determination of playback of an audio signal is shown in FIG. 9 by step 801.

Following the determination of an audio signal playback the apparatus can be configured to read the sensor information.

The reading the sensor information is shown in FIG. 9 by step 803.

In the following example the sensor information outputs are configured to enable the apparatus to determine for each of the categories which state the apparatus is within:

apparatus motion (static; dynamic)

apparatus orientation (horizontal:display up; horizontal:display down; vertical)

apparatus proximity (object proximate-proxy; no object proximate)

The example state combinations output by the sensors shown in FIG. 9 are:

Static+Display Up as shown by combination 811;
Static+Display Down as shown by combination 813;
Dynamic+Display Up as shown by combination 815;

Dynamic+Display Down as shown by combination 817;
Dynamic+Vertical+Proxy as shown by combination 819; and
Undetermined as shown by combination 820.

These combinations can be processed by the use case/mode determiner 251 and use case/mode variant determiner 253 to generate a suitable equalisation or processing output.

For example when the apparatus is static with a display up orientation the use case or mode can be an 'on table' mode and the variant determined is a 'display up' variant. This determination can then lead to equalisation or filtering parameters being set using a suitable 'on table', display up setting 821.

Furthermore when the apparatus is static with a display down orientation the use case or mode can be an 'on table' mode and the variant determined is a 'display down' variant. This determination can then lead to equalisation or filtering parameters being set using a suitable 'on table', display down setting 823.

When the apparatus is dynamic with a display up orientation the use case or mode can be an 'on hand' mode and the variant determined is a 'display up' variant. This determination can then lead to equalisation or filtering parameters being set using a suitable 'on hand', display up setting 825.

The apparatus furthermore can be determined to be dynamic with a display down orientation and therefore the use case or mode can be an 'on hand' mode and the variant determined is a 'display down' variant. This determination can then lead to equalisation or filtering parameters being set using a suitable 'on hand', display down setting 827.

When the apparatus is dynamic with vertical orientation and proximate to a surface the use case or mode can be an 'on ear' mode (which in this example may not have a variant). This determination can then lead to equalisation or filtering parameters being set using a suitable 'on ear' setting 829.

Furthermore in some embodiments the apparatus state is undetermined, in such examples the use case or mode can default to a default or pre-set set of equalisation or processing parameters 830.

With respect to FIG. 10 an example sound generation apparatus 901 is shown. The apparatus is shown comprising an actuator 903 configured to vibrate the display 905 and further cause a recoil vibration through the casing of the apparatus 901. The vibration 911 of the display 905 can be configured to generate sound or acoustic waves from the apparatus (sound from device 913). Furthermore the recoil vibration, when the apparatus 901 is placed on a suitable surface such as a table 917, can generate a coupled vibration 919 within the table 917. The coupled vibration 919 furthermore can then generate sound when leaving the surface of the table (sound from table 921).

Furthermore elements of a public land mobile network (PLMN) may also comprise audio codecs as described above.

In general, the various embodiments of the application may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the application may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this application may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the application may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:

(a) hardware-only circuit implementations (such as implementations in only analog and/or digital circuitry) and (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
providing at least one input signal from at least one sensor of an apparatus;
determining an audio signal reproduction mode from a plurality of audio signal reproduction modes comprising at least: a free space vibration mode, a surface vibration coupling mode, and an earpiece mode;
determining a physical state of the apparatus from a plurality of physical states based at least on the at least one input signal, wherein the plurality of physical states comprises at least a static state and a dynamic state;
controlling at least one audio signal for the audio signal reproduction mode based at least on the physical state of the apparatus; and
reproducing the at least one audio signal using at least one actuator within the apparatus by actuating a display surface of the apparatus while the apparatus remains in the determined physical state,
wherein controlling the at least one audio signal comprises:
determining and adjusting at least one audio tuning parameter based on the physical state of the apparatus; and
tuning the at least one audio signal based on the at least one tuning parameter so as to improve the quality of the at least one audio signal from the apparatus display surface for the determined audio signal reproduction mode and the determined physical state.

2. The method as claimed in claim 1, wherein reproducing the at least one audio signal while the apparatus is in the surface vibration coupling mode comprises: coupling vibration of the apparatus display surface to an object such that the object radiates the vibration to an object surface and reproduces the at least one audio signal at the object surface as acoustic energy.

3. The method as claimed in claim 2, wherein determining the physical state of the apparatus comprises determining that the apparatus is located on an object and controlling the at least one audio signal comprises processing the at least one audio signal to allow for the coupling between the vibration of the apparatus display surface and the object.

4. The method as claimed in claim 3, wherein determining the physical state of the apparatus further comprises at least one of:
determining the apparatus display surface is facing upwards, wherein controlling the at least one audio signal comprises processing the at least one audio signal to allow for the coupling between the vibration of the apparatus display surface and the object when the apparatus display surface is facing upwards; and
determining the apparatus display surface is facing downwards, wherein controlling the at least one audio signal comprises processing the at least one audio signal to allow for the coupling between the apparatus display surface and the object when the display is facing downwards.

5. The method as claimed in claim 1, wherein actuating the display surface of the apparatus comprises vibrating the apparatus display surface to generate vibration which reproduces the at least one audio signal at the apparatus display surface as acoustic energy.

6. The method as claimed in claim 5, wherein determining the physical state of the apparatus comprises determining that the apparatus is located on an object and controlling the at least one audio signal comprises processing the at least one audio signal to allow for the at least one audio signal reproduction at the apparatus display surface as acoustic energy.

7. The method as claimed in claim 6, wherein determining the physical state of the apparatus further comprises one of:
determining the display surface is facing upwards while the apparatus is located on an object, wherein controlling the at least one audio signal comprises processing the at least one audio signal to allow for the at least one audio signal reproduction at the apparatus display surface as acoustic energy when the display surface is facing upwards;
determining the display surface is facing downwards while the apparatus is located on the object, wherein controlling the at least one audio signal comprises processing the at least one audio signal to allow for the at least one audio signal reproduction at the apparatus display surface as acoustic energy when the display surface is facing downwards; and
determining the display surface is proximate to the object, wherein controlling the at least one audio signal comprises processing the at least one audio signal to simulate earpiece audio signal reproduction at the display surface.

8. The method as claimed in claim 1, wherein providing the at least one input signal comprises at least one of:
providing a sensor signal;
providing an accelerometer signal;
providing a proximity signal;
providing a camera signal;
providing a touch sensor signal;
providing a compass signal;
providing a touch input signal;
providing a user interface signal; and
providing a microphone signal.

9. The method as claimed in claim 1, wherein tuning the at least one audio signal comprises at least one of:
filtering the at least one audio signal, wherein the at least one tuning parameter define a frequency response for the filtering;
equalising the at least one audio signal, wherein the at least one tuning parameter define a frequency response for the equalising; and
adjusting the level of the at least one audio signal wherein the at least one tuning parameter defines an adjustment factor for the adjusting of the level of the at least one audio signal.

10. The method as claimed in claim 1, wherein determining the physical state of the apparatus based on the at least one input signal comprises:
determining at least one audio reproduction indication based on at least one audio signal from at least one of a microphone and an accelerometer input, and
controlling the at least one audio signal comprises determining the at least one tuning parameter based on the at least one audio reproduction indication for tuning the reproduction of the at least one audio signal.

11. An apparatus comprising at least one processor and at least one memory including computer code for one or more programs, the at least one memory and the computer code configured to with the at least one processor cause the apparatus to at least:
provide at least one input signal from at least one sensor of the apparatus;
determine an audio signal reproduction mode from a plurality of audio signal reproduction modes comprising at least: a free space vibration mode, a surface vibration coupling mode, and an earpiece mode;
determine a physical state of the apparatus from a plurality of physical states based at least on the at least one input signal, wherein the plurality of physical states of the apparatus comprises: a static state and a dynamic state;
control at least one audio signal for the audio signal reproduction mode based at least on the physical state of the apparatus; and
reproduce the at least one audio signal using at least one actuator within the apparatus by actuating a display surface of the apparatus while the apparatus remains in the determined physical state,
wherein the control of the at least one audio signal comprises determining and adjusting at least one audio tuning parameter based on the physical state of the apparatus; and tuning the at least one audio signal based on the at least one tuning parameter so as to improve the quality of the at least one audio signal from the display surface for the determined audio signal reproduction mode and the determined physical state.

12. The apparatus as claimed in claim 11, wherein the reproduced at least one audio signal causes the apparatus to:
couple vibration of the apparatus display surface to an object such that the object radiates the vibration to an object surface and reproduce the sound at the object surface as acoustic energy.

13. The apparatus as claimed in claim 11, wherein actuating the apparatus display surface generates vibration which reproduces the sound at the apparatus surface.

14. The apparatus as claimed in claim 11, wherein the tuned at least one audio signal causes the apparatus to at least one of:
filter the at least one audio signal, wherein the at least one tuning parameter define a frequency response for the filtering;
equalise the at least one audio signal, wherein the at least one tuning parameter define a frequency response for the equalising; and
amplify the at least one audio signal wherein the at least one tuning parameter defines a gain for the amplifying.

15. The apparatus as claimed in claim 11, wherein the determination of the physical state of the apparatus based on the at least one input signal causes the apparatus to:
determine an audio reproduction indication based on at least one audio signal from at least one of a microphone and an accelerometer input; and
control of the at least one audio signal further causes the apparatus to determine at least one tuning parameter based on the audio reproduction indication for tuning the reproduction of the at least one audio signal.

16. An apparatus comprising:
at least one sensor;
an outer cover;
a display suspended relative to the outer cover by at least two actuators located between the display and the outer cover;
at least one processor and at least one memory including computer code for one or more programs, the at least one memory and the computer code configured to with the at least one processor cause the apparatus to at least:
determine the apparatus is operating in one of a plurality of audio signal reproduction modes comprising at least: a free space vibration mode, a surface vibration coupling mode, and an earpiece mode;
vibrate the display using the at least two actuators to produce sound based on audio signals according to the determined audio signal reproduction mode;
determine an orientation of the display and one of a plurality of motion states of the apparatus based on at least one input signal received from the at least one sensor of the apparatus, wherein the plurality of motion states of the apparatus comprises at least a dynamic motion state and a static motion state;
monitor at least one of: the sound produced from the display via the at least one sensor, and the vibrations from the at least two actuators via the at least one sensor;
determine and adjust at least one tuning parameter for the determined audio signal reproduction mode based on the orientation of the display, the motion states, and the monitored sound and/or vibrations; and
tune the audio signals based on the adjusted at least one tuning parameter so as to improve the quality of the audio signals while the apparatus remains in the determined sound reproduction mode, the determined orientation, and the determined motion state.

17. The method as in claim 1, wherein the input signal is indicative of environmental conditions in which the apparatus is operating in.

18. The method as in claim 1, wherein the plurality of physical states further comprises an undetermined state, and wherein controlling the at least one audio signal comprises applying a default set of audio tuning parameters for the determined audio signal reproduction mode.

19. The apparatus as in claim 11, wherein the input signal is indicative of environmental conditions in which the apparatus is operating in.

20. The apparatus as in claim 11, wherein the plurality of physical states further comprises an undetermined state, and wherein control of the at least one audio signal comprises applying a default set of audio tuning parameters for the determined audio signal reproduction mode.

* * * * *